Aug. 22, 1961 J. O. SILVEY 2,997,582

TELEVISION RECEIVER WITH ULTRA HIGH FREQUENCY CAVITY TUNER INSIDE VERY HIGH FREQUENCY TURRET TUNER

Original Filed Aug. 9, 1952 4 Sheets-Sheet 1

INVENTOR.
JOHN O. SILVEY

BY John M. Calimafde

ATTORNEY

INVENTOR.
JOHN O. SILVEY
BY
John M. Calimafde
ATTORNEY

INVENTOR.
JOHN O. SILVEY
BY
John M. Calimafde
ATTORNEY

INVENTOR.
JOHN O. SILVEY
BY
John M. Calimafde
ATTORNEY 2,997,582
Patented Aug. 22, 1961

2,997,582

TELEVISION RECEIVER WITH ULTRA HIGH FREQUENCY CAVITY TUNER INSIDE VERY HIGH FREQUENCY TURRET TUNER

John O. Silvey, Fort Wayne, Ind., assignor to International Telephone and Telegraph Corporation, a corporation of Maryland Original application Aug. 9, 1952, Ser. No. 303,457, now Patent No. 2,800,581, dated July 23, 1957. Divided and this application Oct. 24, 1957, Ser. No. 692,117
7 Claims. (Cl. 250—20)

This invention relates to R-F tuning systems, and particularly to such systems as utilized in television receivers.

This is a divisional application of my co-pending application, Serial No. 303,457, filed August 9, 1952, now Patent No. 2,800,581 for "Television Receiver with Ultra High Frequency Cavity Tuner Inside Very High Frequency Turret Tuner."

The tuner unit of the television receiver consists of the R-F amplifier, local oscillator, and converter (mixer). These circuits are usually assembled and aligned as a separate unit and function generally to select, amplify and convert the incoming R-F signal to a predetermined I-F frequency for which the I-F stage is aligned. The R-F frequencies presently allocated to commercial television, fall within the very high frequency (VHF) band, and therefore, the tuners designed for present day television receivers may be designated VHF tuners.

With the advent of allocating ultra high frequencies (UHF) for commercial television, there has arisen the problem of designing UHF tuners which may be practically and economically incorporated in the present day television receiver. Many different types of UHF tuners have been developed, which, like the VHF tuner, are assembled and aligned as separate units. Although in a technical sense they have been made to operate satisfactorily, they are costly and bulky, thereby materially increasing the cost of the receiver.

It is the object of this invention to provide a combination VHF-UHF tuner contained in a single unit, which is efficient and economical.

It is a further object of this invention to provide a tuner, of the turret type, for both the VHF and UHF frequency bands.

Another object of the invention is to provide a combination tuner wherein many of the same components are utilized for both VHF and UHF tuning.

Another object of the invention is to provide a unique UHF tuner which is simple and efficient.

In accordance with one aspect of the invention, there is provided a VHF tuner comprising means for selecting a signal of a given VHF frequency, and means for reducing the frequency of the VHF signal to a predetermined I-F frequency. In combination with the VHF tuner, there is provided a UHF tuner electrically and mechanically coupled therewith and positioned interiorly of said VHF tuner. The UHF tuner comprises means for selecting a signal of a given UHF frequency and means for reducing the UHF frequency to the predetermined I-F frequency. The I-F signal produced by the UHF tuner is then injected into the VHF tuner, which now operates simply as an amplifier.

In accordance with another asject of the invention there is provided a combination VHF-UHF tuner wherein the UHF local oscillator means for producing the predetermined I-F frequency includes the local oscillator of the VHF tuner.

The above mentioned and other features and objects of this invention and the manner of attaining them will become more apparent and the invention itself will be best understood by reference to the following description of an embodiment of the invention taken in conjunction with the accompanying drawings, in which:

FIG. 8 showing a section taken along lines 8—8 of FIG. 4.

Figure 1:
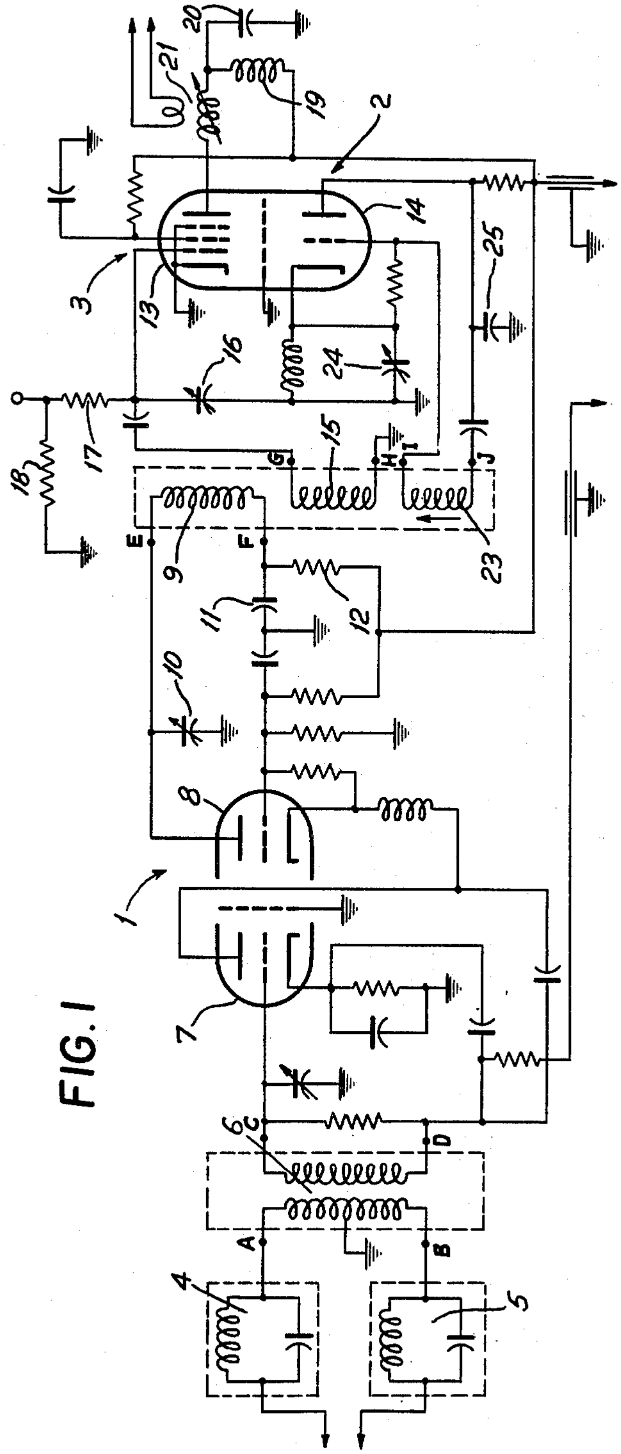
FIG. 1 shows schematically a diagram of the circuits comprising a VHF tuner.

Referring now to FIG. 1 there is shown the VHF tuner comprising an R-F amplifier section 1, a local oscillator 2 and a converter 3. The desired channel is selected by switching the turret tuner (shown in FIG. 4), whereby the proper sets of coils are inserted into the amplifier, converter and oscillator circuits. Since turret tuners are well known to the art, the mechanical operation of the tuner will not be described, except as it affects the novelty of this invention. Further, the circuitry shown by FIG. 1 is known to the art and, therefore, the detailed operation of each of the component parts will be omitted from the explanation.

The signal from an antenna is coupled through tuned antenna input circuits 4, 5, to the first R-F stage through a center tapped transformer indicated at 6. The R-F signals are fed to the grid of tube 7 and are amplified in this circuit, which is the first stage of a two-stage amplifier. The two-stage amplifier may be of the type known as a driven grounded-grid R-F amplifier. The plate circuit of the second stage 8, of the R-F amplifier, is tuned by the inductance of the primary winding 9 of the mixer input coil in conjunction with the parallel combination of capacitor 10 and tube output capacitance in series with capacitor 11. Capacitor 10 is an adjustable trimmer capacitor. The primary winding 9 is the plate load for the R-F amplifier 8; resistor 12 is provided to broaden the response of this circuit.

A pentode-triode type tube may be employed as a mixer-oscillator tube; one section 13 being used as a mixer and the other section 14, as the oscillator. The grid circuit of the mixer tube receives the R-F signal and oscillator signal from the secondary 15 of the mixer input coil which is inductively coupled to both the oscillator and R-F amplifier. Grid leak bias for the mixer is developed by capacitor 16, resistors 17 and 18. Capacitor 16 is an adjustable trimmer capacitor for peaking the mixer grid circuit. Coil 19, which provides the plate load for the mixer, is by-passed by capacitor 20 in order to prevent regenerative feedback in the mixer. Adjustable coil 21 couples the mixer output to the first I-F amplifier stage.

The second half of the tube is employed as a modified Colpitts type oscillator. The oscillator coil 23 is inductively coupled to the mixer grid via mixer coil 15 for oscillator injection. Capacitors 24 and 25 form the split capacitor of the Colpitts oscillator. Capacitor 24 may be a variable dielectric type capacitor used for oscillator "fine tuning."

Thus, operating as a VHF tuner, the R-F tuned amplifier 1 selects a signal of a given frequency in the VHF band and applies this signal to the grid of the mixer 3. The oscillator 2 provides a local frequency which is applied to the mixer, where it, together with the R-F signal, is heterodyned and converted to an I-F frequency. The output from the mixer is then applied to the first I-F stage.

Figure 2:
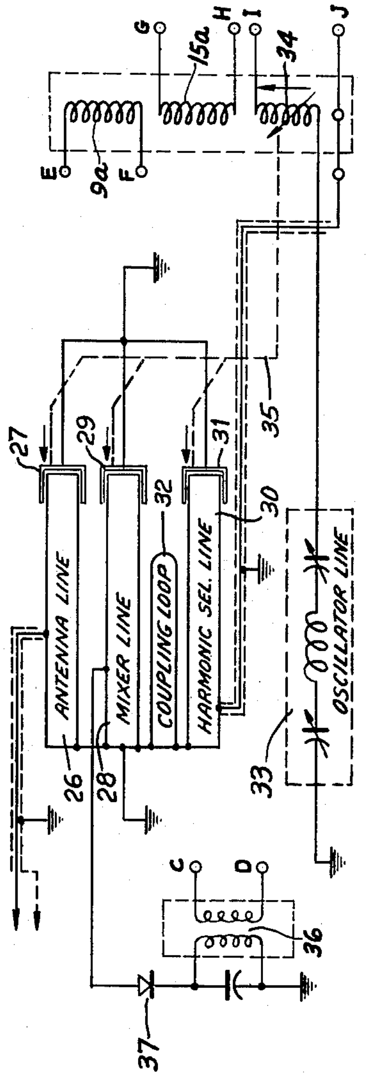
FIG. 2 shows schematically a diagram of the UHF tuner, forming an embodiment of the invention.

Referring now to FIG. 2, the UHF tuner, shown schematically, comprises, preferably, a tuned antenna circuit of the coaxial line type 26, tunable by a variable plunger type capacitor 27 at the open end of a quarter-wave line, The tuned antenna line may be aperture-coupled to a tuned crystal detector line 28, tunable by a variable capacitor 29 at the open end of the quarter-wave line. The proper local frequency is selected by a harmonic selector line 30, tunable by a variable capacitor 31 at the open end of the quarter-wave line. The line 30 is tuned to a third harmonic of the VHF oscillator and may be loop-coupled shown at 32 to the mixer line. The oscillator of the VHF circuit is tuned to one third-frequency of the UHF frequency by a variable oscillator line 33 coupled to a variable oscillator coil 34 which is inserted into the VHF oscillator circuit for UHF reception. The variable capacitors 27, 29 and 31 respectively, and the variable inductance 34 are ganged mechanically as indicated at 35.

A transformer coupling 36 is coupled on the secondary side to a crystal detector 37, and is tuned in accordance with present day standards to 41.25–45.75 mc. In the UHF position of the turret the transformer 36 provides grid tuning for the first stage of the R-F amplifier 1. The coils 9, 15 and 23 are also adjusted for an output of 41.25–45.75 mc. and in the UHF position provides plate tuning for the second stage of the amplifier 1 and grid tuning for the oscillator 2 and mixer 3, respectively. Since the VHF tuner operates into a 41.25–45.75 mc. I-F amplifier, also in accordance with present day standards, then at UHF the R-F amplifier and mixer provide additional I-F amplification to compensate for the conversion loss, and absence of R-F amplification.

When the tuner is switched from VHF to UHF, the component strips shown by dotted lines in FIG. 1 are switched out of circuitry and the component strips shown in FIG. 2, are switched into circuit operating connection. Therefore, coil 9*a* replaces coil 9 in the plate circuit of amplifier 8, coil 15*a* replaces 15, coil 34 replaces 23, etc. The terminals represented by lettered circles A—J indicate the position at which the coils are connected into the circuit.

Figure 3:
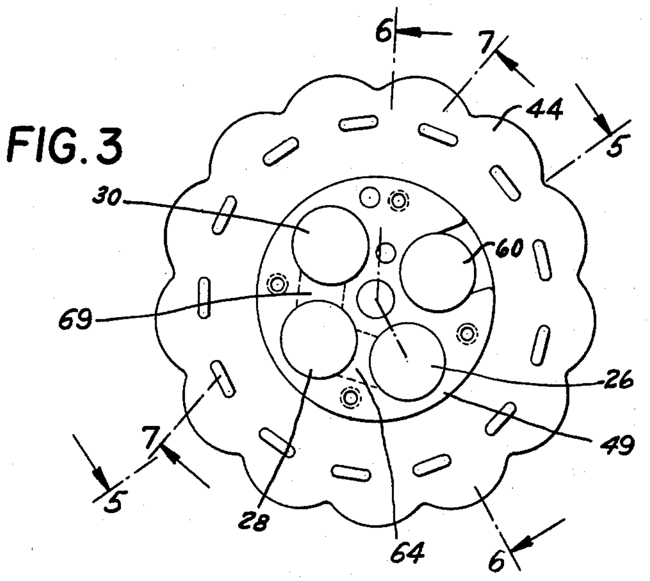
FIGS. 3–8 show the mechanical construction of the combination VHF-UHF turret tuner: the FIGS. 5–7 representing sections taken along corresponding lines of FIG. 3.
Figure 5:
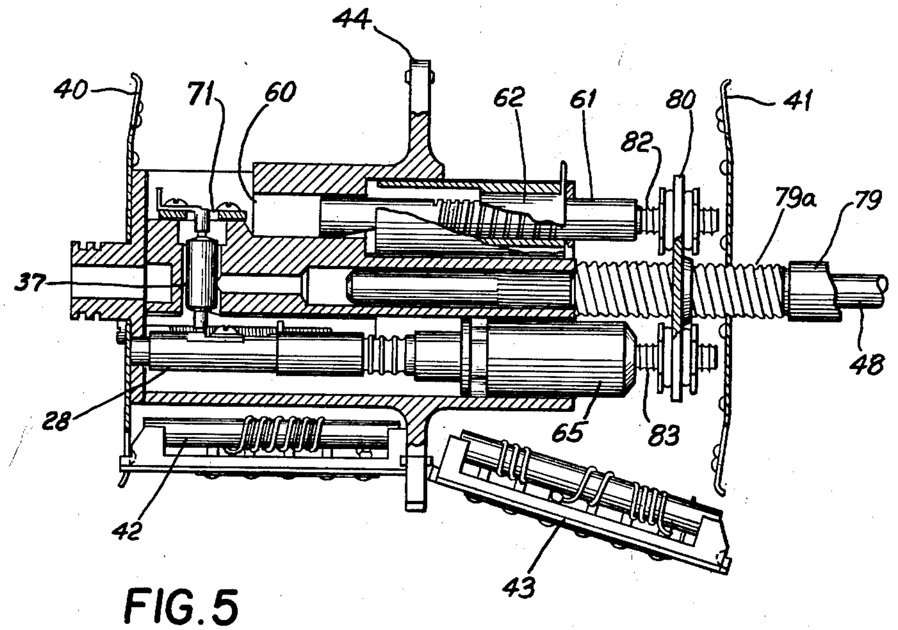
Figure 4:
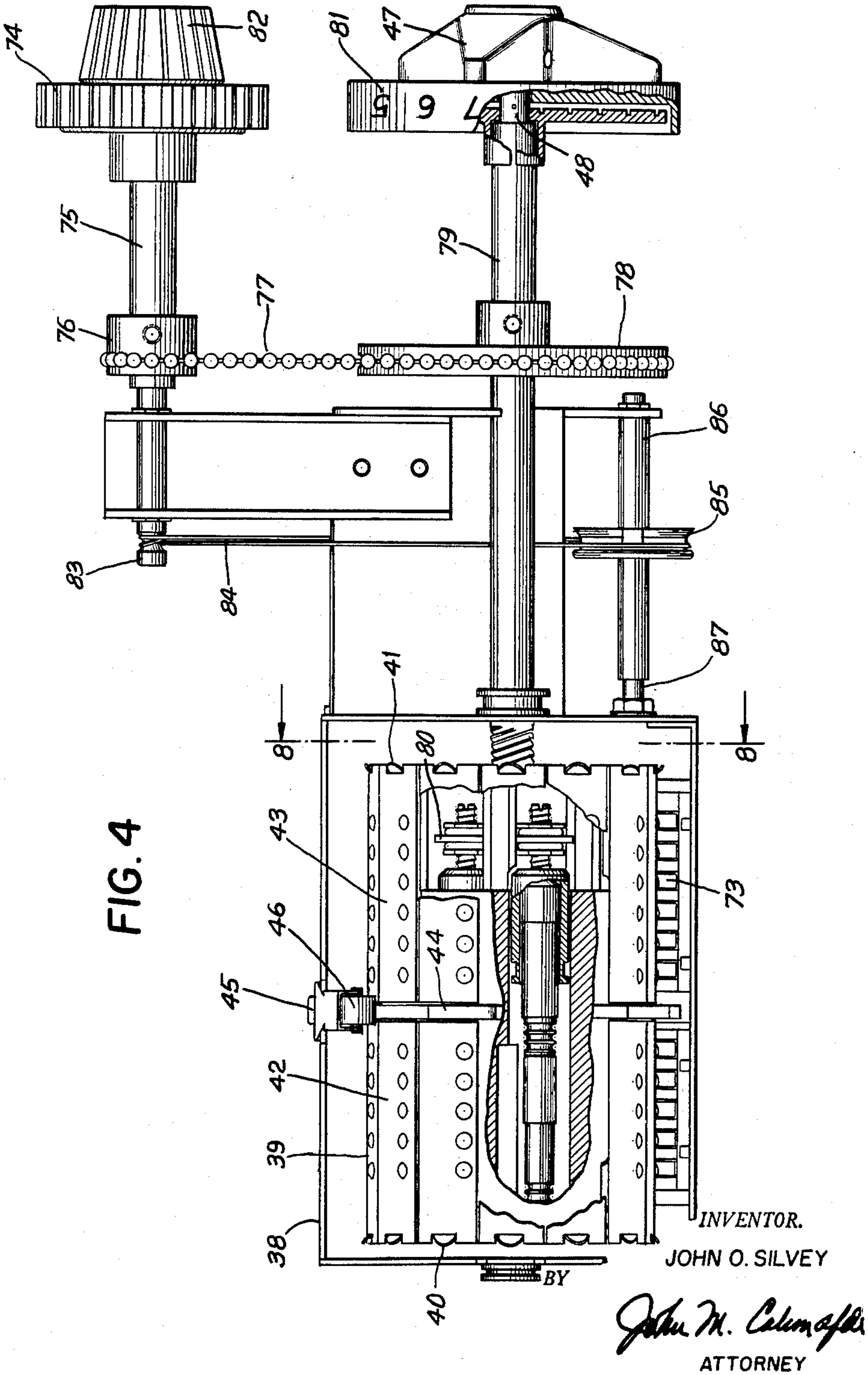

As best seen in FIGS. 3, 4, 5 and 8, housing 38 is provided for the turret tuner 39. The turret tuner comprises a pair of spring plates 40 and 41 respectively (FIG. 5) positioned at either ends of the turret to secure the outer ends of circuit component panels generally indicated at 42 and 43. The spring plates are fastened (described hereinafter) to a UHF tuner cylinder or support 49 by means such as screws 49*a*. The other ends of the panels 42, 43 are secured in place by a scallop shaped disk 44 (FIG. 3) positioned intermediate the spring plates 40 and 41 respectively. Sufficient scallops are formed on disk 44 to provide 13 positions; each position being referenced by the detents in the scallop. A detent spring 45 (FIGS. 4, 8) attached to the turret housing 38 forces a detent spring wheel 46 to ride on the scallop surface of the disk 44. The turret 39 is rotated by a tuning dial knob 47 coupled to the turret by a shaft 48 (FIGS. 4, 5).

The structure of the turret tuner for the VHF circuit components is described and claimed in Patent No. 2,706,252, granted April 12, 1955.

Interiorly of the VHF turret component members, there is mounted on the shaft 48 (FIG. 5) the UHF tuners assembly. The UHF tuner assembly is mounted in a cylinder 49 and comprises the tunable quarter-wave lines illustrated in FIG. 2.

Figure 6:
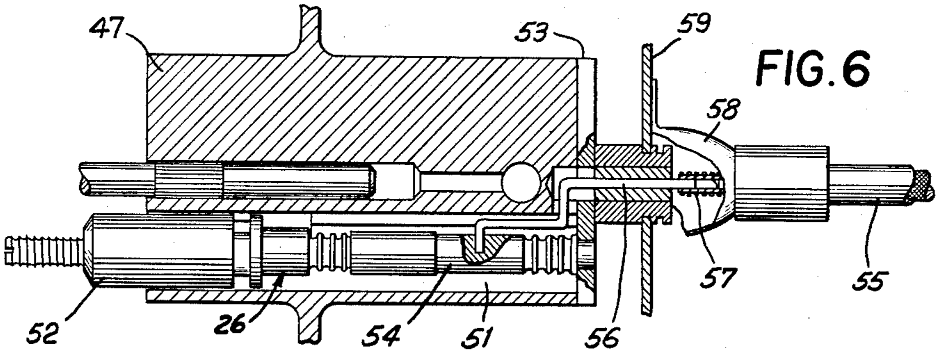

Referring to FIG. 6, which is a section taken along lines 6—6 of FIG. 3, the antenna coaxial line 26 is a quarter-wave coaxial line housed in a cavity 51 and tuned by means of a plunger type capacitor 52 at the open end of the line. A ground plate 53 is provided to short circuit the inner conductor 54 of the coaxial line 55 with the tuner housing. The input energy is applied over the coaxial line 55 to the antenna input lead 56 over a rotatable antenna contact 57. The outer conductor 58 of the coaxial line 55 is grounded to a portion of the tuner chassis 59 and rotatable thereon. The antenna contact 57 is made rotatable to permit rotation of the tuner assembly without twisting the antenna input leads.

Referring for a moment to FIG. 2, the oscillator line 33, which operates as a variable tuned circuit, is tuned to one-third frequency of the R-F energy. The third harmonic of the oscillator energy is taken from the plate circuit of oscillator 14 and fed to the harmonic selector line 30. As best seen in FIG. 5, the tuning oscillator, corresponding to oscillator line 33 and coil 34 shown in FIG. 2, comprises an oscillator cavity 60 which is tuned by an oscillator plunger 61 at the open end of the line. Capacitance is provided by capacitor plate 62.

The R-F energy from the antenna line 26 is coupled to the mixer line 28 (FIG. 5) by means such as aperture coupling 64 (FIG. 3). The mixer line 28 is preferably tuned by a plunger type capacitor 65.

The R-F energy and the oscillator energy are mixed preferably in a crystal type mixer 37 (corresponding to detector 37 of FIG. 2). A by-pass may be provided for the R-F energy by a capacitor of low value inductance 71.

Figure 7:
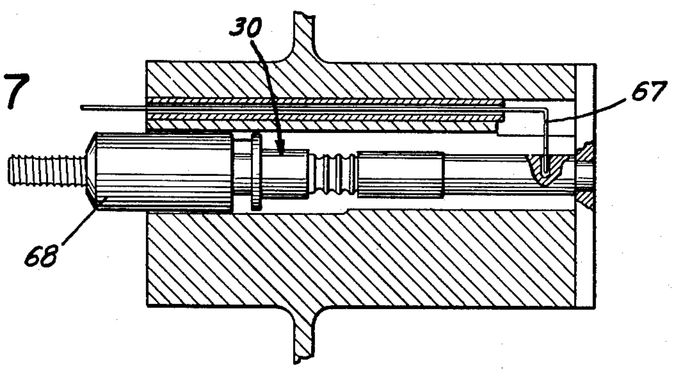
Figure 8:
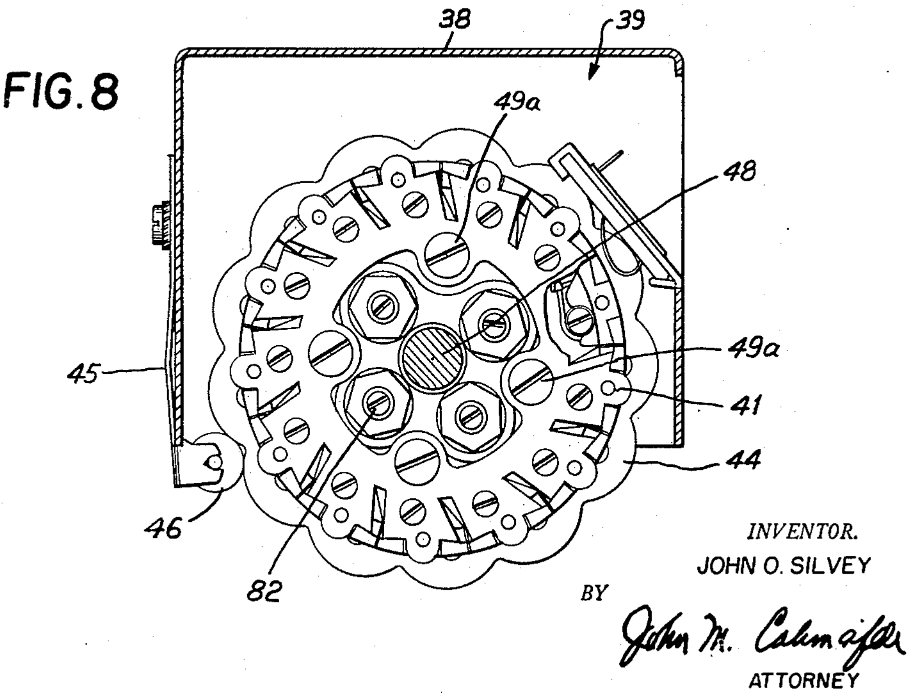

Referring now to FIG. 7, a coaxial line corresponding to harmonic selector line 30 (FIG. 2) is fed by an oscillator injection line 67. The coaxial line 30 is tuned by means of a plunger type capacitor 68 to the third harmonic of the local oscillator, which according to present day standards is preferably 41.25 mc. above the R-F antenna line frequency.

The harmonic selector line 30 is coupled to the mixer line 28 by aperture coupling 69 and a coupling loop 32 (FIGS. 2, 3).

As may best be seen in FIG. 4, the UHF tuning is accomplished by rotating a UHF tuning knob 74, which is coupled to a drive sleeve 75 for driving a pulley 76. The pulley 76 transmits power through a drive chain 77 to the UHF tuning pulley 78. The UHF tuning pulley 78 is secured to a tuning sleeve 79 which linearly drives a UHF tuning plunger drive plate 80 (FIGS. 4, 5). The UHF tuning sleeve 79 also drives the UHF tuning dial 81. The details of the dial tuning device is explained in U.S. Patent No. 2,775,896, filed January 1, 1957. The drive plate 80 is in the form of a disk having a centrally tapped hole to accommodate the threaded sleeve drive 81 which is formed at one end of the tuning sleeve 79, or it may be a separate member coupled to the sleeve 79. In addition to the centrally tapped hole, there are bored and tapped four holes to engage the threaded ends of the tuning plungers; e.g., ends 82 and 83 (FIG. 5). When the sleeve 79 is rotated the drive plate is moved linearly causing the plungers to move linearly within the cavities and vary the characteristics of the coaxial lines. The ends of the plungers are threaded to permit initial adjustment of the plungers.

Since the same oscillator tube and components, except for tuned circuit 33 are used at UHF and at VHF, fine tuning is accomplished for both through a fine tuning drive shaft knob 82. The knob 82 is coupled to a shaft 83 which drives cord 84, fine tuning pulley 85, and fine tuning shaft 86. The fine tuning shaft 86 is connected to a fine tuning condenser 87.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. In combination, a very high frequency tuner comprising means for selecting a signal of a given very high frequency and means for reducing the frequency of said signal to a predetermined intermediate frequency; an ultra high frequency tuner electrically coupled to said very high frequency tuner comprising means for selecting a signal of a given ultra high frequency, and means for reducing said ultra high frequency to said intermediate frequency; means for converting said very high frequency selecting means into intermediate frequency amplifying means; and means for injecting said intermediate frequency signal into said converted very high frequency tuner selecting means.

2. In combination, a very high frequency tuner comprising means for selecting a signal of a given very high frequency, local oscillator means, and mixer means for heterodyning the frequency of the selected signal with the frequency of the local oscillator, to produce a predetermined intermediate frequency; an ultra high frequency tuner comprising means for selecting a signal of a given ultra high frequency, means including the local oscillator means of said very high frequency tuner for producing a given frequency, mixer means for heterodyning the frequency of said selected ultra high signal with said given frequency to produce said intermediate frequency, means for converting said very high frequency selecting means into intermediate frequency amplifying means, and means for injecting said intermediate frequency into said very high frequency tuner selecting means.

3. The combination according to claim 2, wherein said intermediate frequency amplifying means further comprises said mixer means.

4. In combination, a very high frequency tuner comprising means for selecting a signal of a given very high frequency, local oscillator means, and mixer means for heterodyning the frequency of the selected signal with the frequency of the local oscillator, to produce a predetermined intermediate frequency; an ultra high frequency tuner comprising means for selecting a signal of a given ultra high frequency, a tunable coaxial harmonic selector line coupled to said local oscillator means and tuned to a third harmonic thereof, to produce a given frequency, mixer means for heterodyning the frequency of said selected ultra high signal with said given frequency to produce said intermediate frequency, means for converting said very high frequency selecting means into intermediate frequency amplifying means, and means for injecting said intermediate frequency into said very high frequency tuner selecting means.

5. The combination according to claim 4, wherein said ultra high frequency selector means and mixer means comprise tunable coaxial lines, and said mixer line is aperture coupled to said selector line and harmonic selector line respectively.

6. The combination according to claim 5, comprising means for capacitively tuning said coaxial lines, inductive means for varying the frequency of said local oscillator, and means mechanically coupling said capacitive tuning means and said inductive means together, whereby the tuning of each of the coaxial lines and the oscillator may be effected simultaneously.

7. The combination according to claim 5, wherein each of said coaxial lines are one quarter wavelength long at the operating frequency and have one open end respectively, said lines being tunable at the open ends thereof.

References Cited in the file of this patent

UNITED STATES PATENTS 2,798,955 Balash ------------------ July 8, 1957